US005952082A

United States Patent [19]

Normington et al.

[11] Patent Number: 5,952,082

[45] Date of Patent: Sep. 14, 1999

[54] ELECTROPHOTOGRAPHIC RECORDING MEDIUM AND METHOD

[75] Inventors: Charles A. Normington; Gregory E. Pulchinski; Gary G. Schiller, all of Wisconsin Rapids, Wis.

[73] Assignee: Consolidated Papers, Inc., Wisconsin Rapids, Wis.

[21] Appl. No.: 08/896,974

[22] Filed: Jul. 18, 1997

[51] Int. Cl.[6] .................................................. B32B 3/00

[52] U.S. Cl. .......................... 428/195; 428/206; 428/211; 428/216; 428/331; 428/382; 428/411.1; 428/423.1; 428/479.6; 428/511; 428/513; 427/240; 427/356; 427/362; 118/52; 118/117; 118/123; 118/227; 118/410

[58] Field of Search .................................... 428/195, 211, 428/215, 216, 423.1, 411.1, 511, 382, 331, 206, 207, 513, 479.6; 427/240, 356, 420, 362; 118/123, 52, 410, 411, 413, 227, 117

[56] References Cited

U.S. PATENT DOCUMENTS

| | | |
|---|---|---|
| 3,124,480 | 3/1964 | Mahoney et al. . |
| 3,124,504 | 3/1964 | Mahoney et al. . |
| 3,230,867 | 1/1966 | Nelson . |
| 4,250,211 | 2/1981 | Damrau et al. . |
| 4,277,524 | 7/1981 | Nakajima et al. . |
| 4,512,279 | 4/1985 | Damrau et al. . |
| 4,780,336 | 10/1988 | Damrau . |
| 4,848,268 | 7/1989 | Sollinger et al. . |
| 5,112,653 | 5/1992 | Damrau et al. . |
| 5,240,561 | 8/1993 | Kaliski .................................... 162/138 |
| 5,436,030 | 7/1995 | Damrau . |

*Primary Examiner*—Deborah Jones
*Assistant Examiner*—Abraham Bahta
*Attorney, Agent, or Firm*—Juettner Pyle Piontek & Underwood

[57] ABSTRACT

A recording medium particularly suitable for electrophotographic copying is characterized by coated paper that for a given basis weight has proportionally less coating and proportionally more fiber than conventional coated paper made for electrophotographic processes. The base sheet of the coated paper is preferably formed square on a paper machine wet end and has on the order of 40–50% less filler than conventional sheet paper made for electrophotographic processes. After being formed and dried, the base sheet is provided with a top coat weight that is approximately 60% less than the typical coat weight used for conventional paper. The coating is formulated to have sufficient viscosity to stay more on the surface of the base sheet. The coated sheet is calendered to a medium gloss on the order of a 75° TAPPI gloss of about 45, both to preserve a degree of surface roughness to enhance runnability of the paper through an electrophotographic copier and to provide a pleasant and easily readable surface. In improving on conventional paper, the paper of the invention provides for good fusion of dried toner on the paper at marginal lower temperatures.

41 Claims, 3 Drawing Sheets

ELECTROPHOTOGRAPHIC RECORDING MEDIUM AND METHOD

BACKGROUND OF THE INVENTION

This invention relates to a recording medium especially adapted for electrophotographic copiers and printers, and to a method for making the same.

Black and color electrophotographic copiers and printers utilize dry toner to form an image on coated and usually calendered paper. As is known, dry toner as used in a copying machine is electrostatically adhered to paper and then heated and fused to the paper. Fusion is the heating and melting of toner on the paper to cause the toner to become attached to and stay on the paper. To fuse the toner, either one or both sides of the paper sheet may be heated.

To obtain good quality copies from an electrophotographic process, the dry toner electrostatically adhered to the paper must be properly heated and fused on the paper. This requires that adequate heat be applied to the toner and paper to cause complete melting of the toner on the paper so that the toner stays on the paper and a good image is obtained. However, the application of too much heat can damage the paper and degrade the resulting image. On the other hand, if too little heat is applied, the toner may not be properly heated and melted and some of the toner may come off of the paper, degrading the quality of the resulting image.

Another cause of image degradation in the electrophotographic process is bubbling. This problem is associated with running coated paper in a high temperature electrophotographic printer. Although the exact cause of bubbling is not known, it is believed that when coated paper is heated to fuse the toner to the surface, the coating acts as a moisture sealant on the base media. When the base media is heated, it is thought that moisture trapped within the base media is vaporized by the heat but is unable to escape due to the coating on opposite sides of the base media, resulting in localized bubbling in the coating. The ability to properly fuse toner on paper at a lower temperature alleviates the bubbling problem.

Another problem encountered in the electrophotographic process has to do with runability of paper sheet through a copier. Runnability refers to the ability of the paper to feed and deliver through a copying machine without causing jams. The runnability of paper is influenced by the "tooth" of its surface, such that a paper surface with more tooth provides for more friction between it and drive rollers of the copier, resulting in improved runnability of the paper through the copier. Obviously, it is not acceptable for paper to excessively jam within a copier.

SUMMARY OF THE INVENTION

The present invention provides an improved coated paper that is adapted to improve fusion of toner on a surface thereof at marginal fusion temperatures in an electrophotographic process, together with an apparatus for making the paper, a process for making the paper and use of the paper in an electrophotographic process. The coated paper itself comprises a paper base and a coating on each side of the base, with the coating being of a weight on the order of 2.5–5.5 pounds per side per ream. Advantageously, the coating has a weight on the order of 3.5–4.0 pounds per side per ream, which is a very light coat weight as compared with the coat weight found on conventional coated gloss paper, and the coated paper has a basis weight of at least 60 pounds per ream. As a result of the light coat weight, the paper of the invention has a coating weight/basis weight ratio that is on the order of 33%–59% of the coating weight/basis weight ratio of conventional coated gloss paper for a given basis weight. Also as a result of the very light coat weight, the paper of the invention has a coating weight/fiber weight ratio that is on the order of 27%–52% of the coating weight/fiber weight ratio of conventional coated gloss paper for a given basis weight.

It is contemplated that paper embodying the invention be made to have a basis weight in the range of about 60–110 pounds per ream. For a basis weight of about 60 pounds per ream the paper has a coating weight/basis weight ratio on the order of 8%–18%. For a basis weight of about 70 pounds per ream, the coating weight/basis weight ratio is on the order of 7%–16%, and for a basis weight of about 80 pounds per ream, the coating weight/basis weight ratio is on the order of 6%–14%. For a basis weight of about 110 pounds per ream, the coating weight/basis weight ratio is on the order of 4%–10%.

The coated paper of the invention advantageously is formed square on a paper machine so that it has similar properties in both the machine and cross machine directions, and the paper base of the paper contains on the order of 7%–15% filler, which is on the order of 40%–50% less filler than is contained in a conventional paper base. The paper base may be precoated with lightly pigmented coating on each of its sides, with the precoat being at a weight on the order of 1–2.5 pounds per side per ream and the coating being applied on top of the precoat. After being coated and dried, the coated paper is calendered to a 75° TAPPI gloss of 35–50, and preferably to a gloss of about 45. To maintain whiteness of the paper, the furnish used in making the paper base advantageously is groundwood free high brightness bleached pulp.

The foregoing and other features and advantages of the invention will become apparent upon a consideration of the following detailed description, when taken in conjunction with the accompanying drawings.

DETAILED DESCRIPTION

As discussed above, it is desirable that coated paper used in electrophotographic copiers and printers exhibit good runnability through a copier and provide for good fusion of toner on the surface of the paper at the lowest possible temperatures to minimize heat degradation of the paper and bubbling in the coating on the paper.

The present invention provides coated and calendered paper particularly adapted for use in electrophotographic color copiers and printers. The paper has improved runnability and provides better fusion of toner on the paper in marginal temperature conditions than can paper conventionally used in the electrophotographic process. Because of the ability to enable good fusion of toner at temperatures lower than conventionally required, the coated paper of the invention also is less susceptible to bubbling.

The coated paper of the invention differs from conventional papers currently available for electrophotographic processes. A primary improvement of the paper of the invention over such conventional paper is its above mentioned ability to provide better fusion of toner at lower temperatures. As is known, dry toner used in electrophotographic copiers and printers is electrostatically adhered to paper, and the toner and paper are then heated to fuse the toner to the paper to form an image on the paper. Either one or both sides of the paper sheet may be heated to fuse the toner on the sheet. While proper fusion of toner on conventional paper will occur if the paper and toner are exposed to sufficient heat, the paper of the invention enables better fusion to be obtained in marginal, lower temperature conditions than would otherwise be necessary to obtain proper fusion with conventional paper. As a result of the ability to accommodate proper fusion of toner at lower temperatures, it has advantageously been found that for a given temperature in the fusion section of an electrophotographic copier, toner on paper of the invention can be properly fused when the paper is passed through the fusion section at a speed greater than would be required to obtain proper fusion of toner on conventional paper. In other words, to achieve a given degree of toner fusion, paper of the invention can be run through an electrophotographic copier at a greater speed than would be required for conventional paper, which desirably allows a copier to run faster and make more copies per minute. While it is not precisely known why these advantages are obtained, it is believed that the paper of the invention provides better fusion because it has a lightweight coating that has lower thermal conductivity than the heavier coatings on conventional paper, and therefore the paper does not conduct heat away from the toner as fast as does conventional paper.

Figure 1:
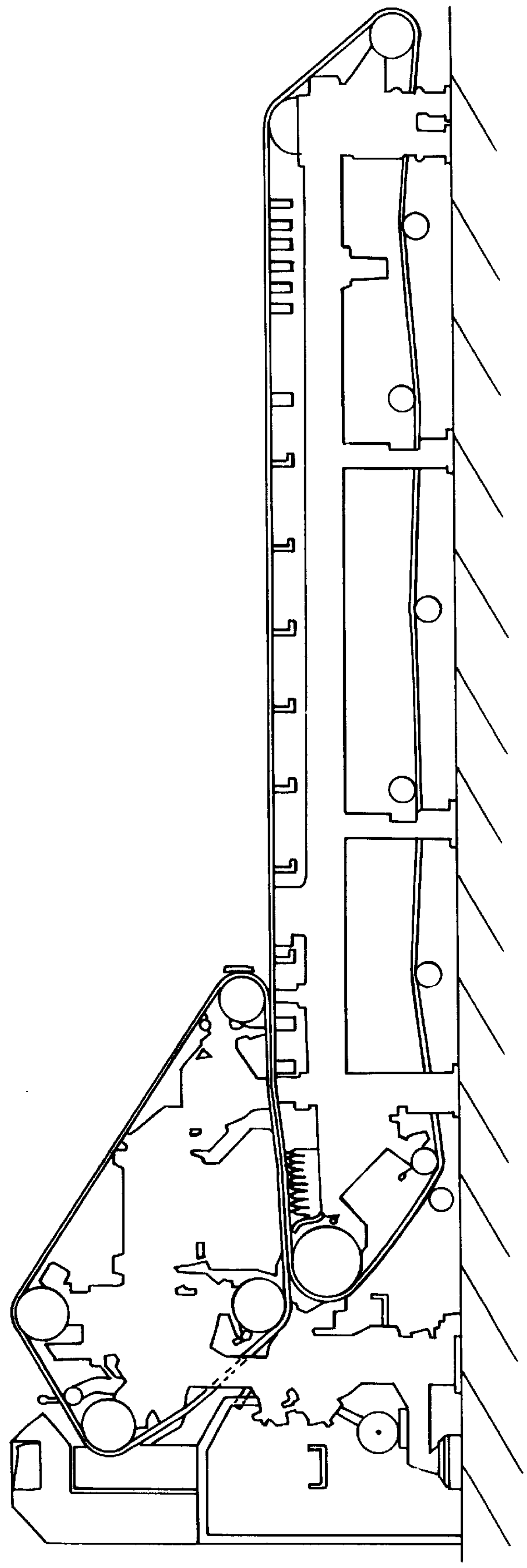
FIG. 1 shows a former section of a papermaking machine for use with the present invention.

The base sheet of the paper of the invention is preferably formed square on a paper machine wet end, for example by a former section as shown in FIG. 1. Since the base sheet is formed square, it has more similar physical properties in both machine and cross machine directions, i.e., similar tensile strength, stiffness, etc., in each direction. Advantageously, but not necessarily, the base sheet is made on a twin-wire paper machine. Furnish is introduced by a headbox of the former section onto the lower wire of the twin-wire paper machine at the paper machine wet end in a path generally parallel to that of the wire. The base sheet is caused to be formed square by having the jet of furnish emitted at substantially the same speed as the speed of travel of the wire. After the furnish is introduced onto the lower wire, it is captured between the lower and an upper wire and carried to a press section of the machine, shown in FIG. 2, where water is removed from both the felt and wire sides of the base sheet. An advantage of the twin-wire papermaking process is that removing water from both surfaces of a paper web causes the surfaces to be more physically similar, e. g., to have similar smoothness, absorbency, etc.

It also is contemplated that the base sheet of the paper of the invention have on the order of 40–50% less filler than conventional paper made for the electrophotographic process. An advantage of using less filler is that the strength and stiffness of the paper are increased, which improves the runnability of the paper. A disadvantage of using less filler is that the resulting paper has decreased whiteness and opacity. For a filler such as calcium carbonate ($CaCO_3$), decreased whiteness occurs with use of less filler because the filler has 95–96 brightness, while bleached fiber has 88–90 brightness.

In accordance with the teachings of the invention, for a given basis weight the paper of the invention has proportionally less coating and more fiber than conventional paper made for electrophotographic processes, i.e., it has a lower coating/fiber ratio than conventional paper. It is contemplated that the paper have a top coat weight or coating weight that is on the order of 60% less than the coat weight typically provided on such conventional paper.

The coating for the paper advantageously is formulated to stay more on the surface of the paper sheet. This is accomplished by giving the coating a sufficiently high viscosity. So that a lighter coat weight may more conveniently be provided on the paper, which gives the paper a lower coating/fiber ratio than conventional paper of the same basis weight, a lower proportion of solids may conveniently be used in the coating than is conventional. Using less solids in the coating decreases the viscosity of the coating. A viscosity increasing agent is therefore added to the coating to give the coating the viscosity necessary to remain more on surface of the base sheet. One such viscosity increasing agent is sodium alginate.

The invention contemplates that the coat weight of the paper be on the order of 2.5–5 lbs/side per ream, with the target being 3.5–4.0 lbs/side per ream. This lightweight coating gives the paper its lower coating/fiber ratio than is conventional for a given basis weight of paper. The paper has a coating/fiber ratio in the range of about 6%–3 %, whereas that ratio for conventional paper is in the range of about 20%–61 %, depending upon the specific basis weight of the paper. The paper also has a coating/basis weight ratio in the range of about 4%–18%, whereas that ratio for conventional paper is in the range of about 13%–31%.

The low coat weight of the paper can be achieved by using a lower proportion of solids in the coating formulation, which makes it easier to apply a low coat weight using blade coaters. The low proportion of solids would decrease the viscosity and change the rheology of the coating sufficiently to cause the coating, when applied to the base sheet, to migrate somewhat into the base sheet. This would not greatly affect fusion ability of the paper, but may detract from the visual appearance and the printed quality of the paper. Therefore, to increase the viscosity of the coating formulation sufficiently to prevent excessive migration of the coating into the base sheet, so that the coating remains primarily on the surface of the base sheet, a viscosity increasing agent is added to the coating formulation. However, even with a viscosity increasing agent such as sodium alginate added to the coating formulation, the viscosity to which the coating is brought may still less than conventional. Alternatively, a light coat weight of coating of conventional formulation can be applied to opposite sides of the base sheet, although the higher solids concentration in the conventional coating formulation increases the difficulty of applying sufficiently light coat weights to the base sheet. The coating formulation used in making the paper of the invention preferably has on the order of 54–58% solids, whereas conventional coating has 61–64% solids.

Figure 2:
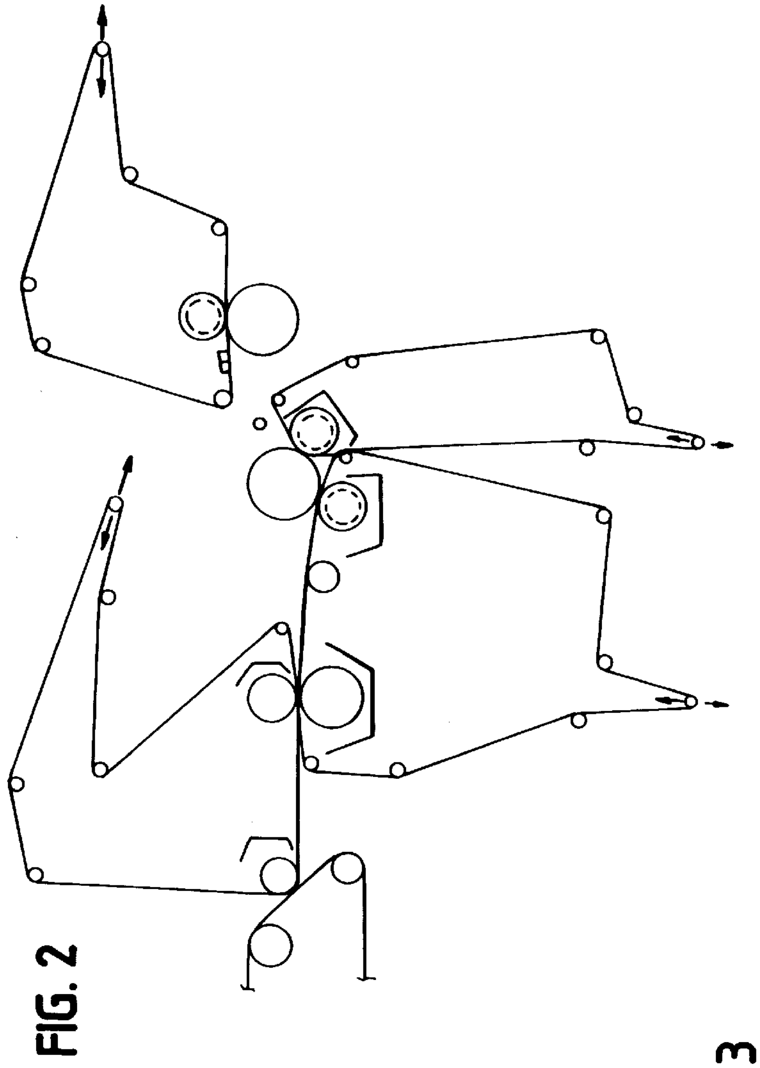
FIG. 2 shows a press section of the papermaking machine.
Figure 3:
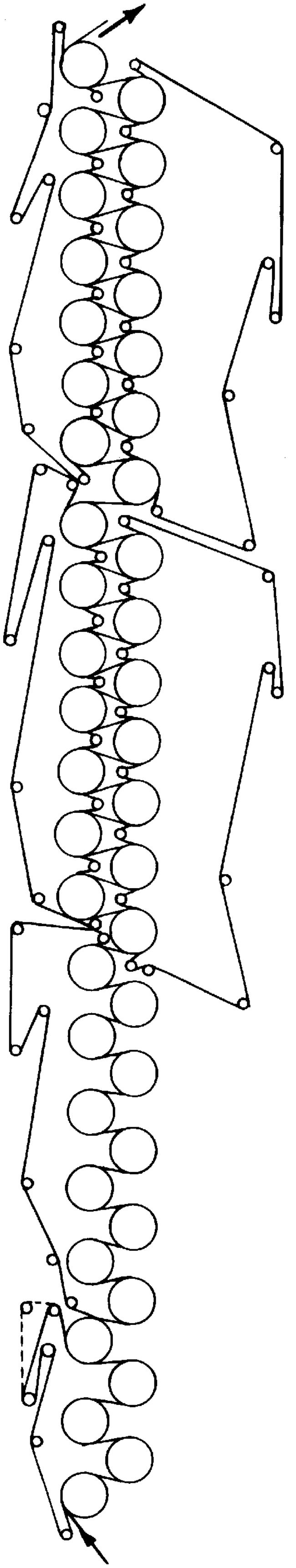
FIG. 3 shows a main dryer section of the papermaking machine, which connects to FIG. 4 as shown by the heavy arrows.
Figure 4:
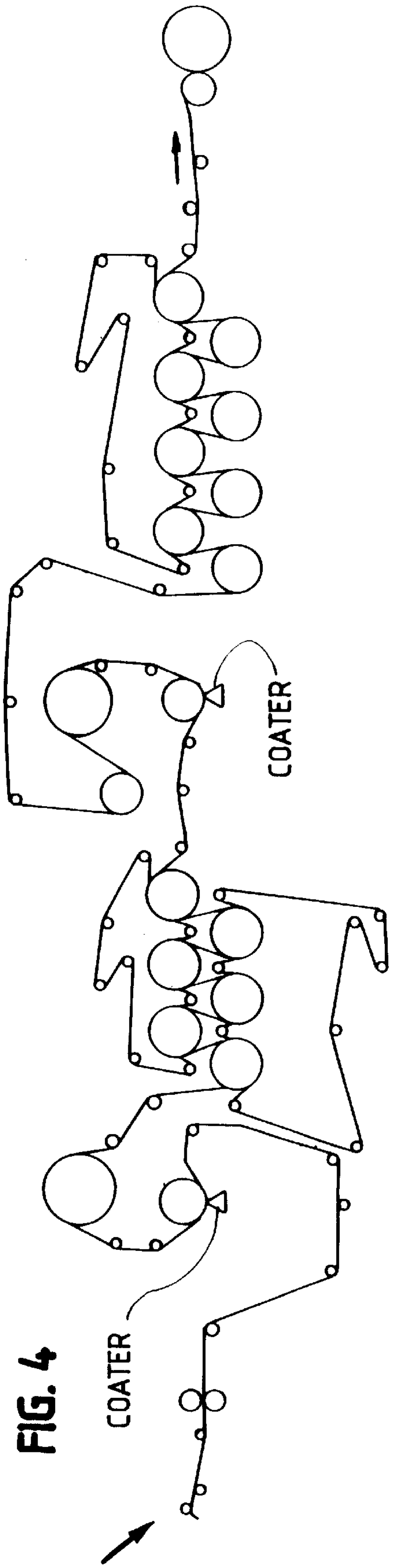
FIG. 4 shows two online coaters and accompanying coater dryers of the papermaking machine.

After leaving the paper machine former section of FIG. 1 and the press section shown in FIG. 2, the base sheet is carried through a main dryer section of the paper machine, seen in FIG. 3, where it is dried before being carried to two online coaters, shown in FIG. 4. The two online coaters apply the above discussed lightweight coating on opposite sides of the base sheet. If desired, the base sheet can be lightly precoated in a conventional manner with a lightly pigmented coating before being top coated. The precoat would be applied at a total weight of about 2–5 lbs/ream, one-half on each side of the base sheet, or at a weight of about 1–2.5 lbs/side per ream.

The top coating can be applied with any conventional blade coater, such as a short dwell time applicator as shown in U.S. Pat. Nos. 4,250,211 and 4,512,279, a fountain type coater shown in U.S. Pat. No. 5,436,030, and/or a double bladed coater as shown in U.S. Pat. No. 5,112,653. In addition, the coating can be applied by a film coater or Spedcoater made by Voith Sulzer GmbH, such as the type shown in U.S. Pat. No. 4,848,268. While blade doctoring is preferred, other suitable types of metering, such as with a doctor rod, grooved or smooth, may be used. The term blade or blade coater as used herein, unless specifically stated, is understood to include such other equivalent metering techniques. The doctor blade shown in U.S. Pat. No. 4,780,336 can advantageously be use to provide low coat weight. The teachings of all of the aforementioned patents in this paragraph are specifically incorporated herein by reference.

Figure 5:
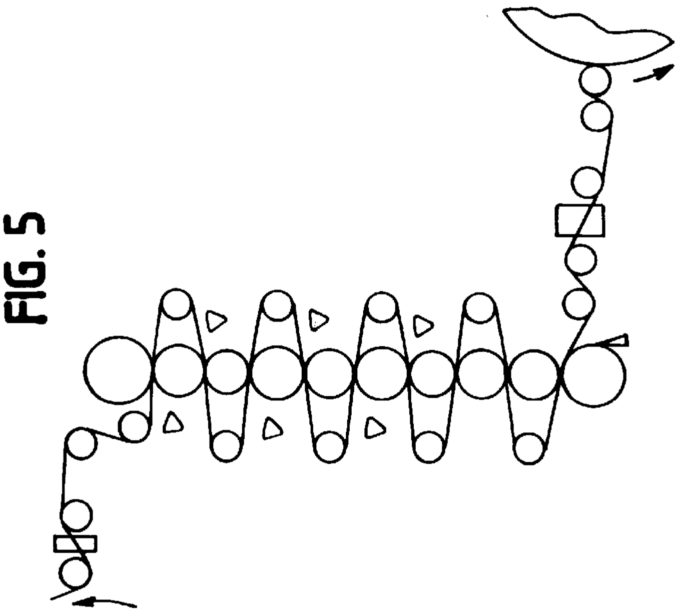
FIG. 5 shows a supercalender for use with the present invention.

After the base sheet is coated, the coated paper is calendered to a medium gloss. Calendering the paper to a medium rather than a high gloss preserves a degree of surface roughness to enhance copier/printer runnability of the paper and to provide a pleasant and easily readable surface on the paper. The calendering can take place on a supercalender, as shown in FIG. 5, in which case the calendering would normally take place off line. Altenatively, hot-soft calendering can be carried out under conventional conditions either on or off the paper machine. Hot-soft calendering equipment such as shown in U.S. Pat. Nos. 3,124,480, 3,124,504, 3,230,867 or 4,277,524, or such equipment currently made and offered by Voith Sulzer GmbH as Model No. G30 2/0, may be used.

The medium gloss on the paper is not provided by specially controlling the calendering process, which is conventional. Instead, a medium gloss occurs because there is less coating on the paper. A medium gloss is normally considered to be a 75° TAPPI gloss of 35–50, with the target for the paper of the invention being about 45 gloss. By comparison, a high gloss paper is normally considered have a 75° TAPPI gloss of 65–90.

As mentioned, the paper of the invention has less coating and more fiber than conventional paper of the same basis weight, and thereby a lower coating/fiber ratio than conventional coated gloss electrophotographic copy paper. The lightweight coating is thought to be less capable than a heavier coating of conducting heat away from toner during a fusion process. The lightweight coating is therefore believed to account for at least one reason for the paper of the invention having better fusion providing capability in marginal temperature conditions than does conventional paper.

In a contemplated embodiment, the paper of the invention may be defined as having the following specifics:

| | |
|---|---|
| Twin Wire | 70 hwk, 18 swk, 12 recycled |
| Paper Machine | 8–10% filler with 2% $TiO_2$ |
| Furnish: | 1–2% carbonate, high-ash broke |
| Coating: | 85 Hi-bright #1 clay, 7 fine carbonate, 8 plastic pigment, 2 starch, 9 latex, other minor ingredients |
| OMC: | 3.5 #/side |
| Supercalender: | 45 gloss |

which result in finished paper having the following typical properties:

45 gloss 87 brightness 91.5 opacity (70#)

2.1–2.3 Parker Print Smoothness

This particular paper has been made in 60#, 70#, 80# and 110# grades, which refers to lbs./ream, where a ream is considered to be 3300 square feet.

As understood by those skilled in the art, in the furnish component of the paper supplied to the twin-wire paper machine, hardwood kraft (hwk) and softwood craft (swk) are groundwood free chemical pulp, i.e., they comprise chemically altered wood. Also, recycled paper is post-consumer paper which, as its name implies, is paper that is returned by consumers to the paper mill for recycling. Filler is pigment that is primarily provided by broke, and is measured on the base sheet after the sheet is formed.

The broke component of the furnish is paper that comes back for recycling through the paper mill system. It comprises internal paper mill recycling, e.g., waste paper that is generated within the mill and collected. Much of the broke is usually coated, i.e., it is waste paper that has already been coated, and the coating on the broke has a high ash or high filler component. The filler component of the broke is sufficiently high that the filler in the coating on the broke provides most of the filler (e.g., the 8–10% filler). In other words, in making the paper of the invention, a substantial amount of filler need not be separately added to the furnish above and beyond that provided by the coating on the broke. However, the titnium dioxide ($TiO_2$) component of the furnish is added to provide whiteness and opacity, and the 1–2 % carbonate may be added to the furnish if carbonate is not otherwise sufficiently provided by the broke.

The furnish used in making the base sheet of the paper is a waterborne furnish that is applied by the headbox (FIG. 1) to the twin wires of the paper machine to form the base sheet. After passing through the press section (FIG. 2) for extraction of excess water from the base sheet, the base sheet is next carried through the main dryer section (FIG. 3) for being dried. The base sheet comprises hwk, swk, recycled paper and broke. Broke usually comprises 25–30% of the furnish, but normally is not separately identified in terms of the portion it comprises of the furnish because it is understood in the papermaking industry that it is customarily part of and makes up 25–30% of the furnish. The furnish therefore comprises hwk, swk, recycled paper and broke. Because much of the broke is coated, it contains a considerable amount of filler or ash, i.e., pigment. Pigment is part of the broke, and the pigment component of the broke provides the 8–10% filler of the furnish. Filler is part of the base sheet.

The fiber in the paper is part of the base sheet and is provided by the swk, hwk, recycled paper and broke. The fiber is preferably groundwood free high brightness bleached pulp. Advantageously, there is no fiber provided by groundwood in the furnish, since groundwood is relatively dark and its use would decrease the whiteness of the base sheet.

After the base sheet is formed, each side of the base sheet is coated, usually by two online coaters (FIG. 4), e.g., an on machine coater (omc) on each side of the web. The base sheet is coated to a coat weight of about 2.5–5.5 lbs/side per ream, with the target being about 3.5–4.0 lbs/side per ream, and dried to a final standard moisture of about 3.5–5.5%.

In the particular coating formulation listed above, it is understood by those skilled in the art that hi-bright clay #1 is a generic term for clay that has a higher than regular brightness. fine carbonate is a pigment that serves as a whitener, and the plastic pigment is comprised primarily of styrene spheres which are hollow but, if desired, may be solid. The plastic pigment aids in achieving gloss on the paper during calendering. The starch and latex components of the coating formulation are binders that hold the coating pigments together and on the sheet of paper. The other minor ingredients of the coating include (1) viscosity modifiers; (2) a lubricant that aids in the supercalendering process to prevent "picking" (sticking of the paper to the supercalender roll); and (3) an insolubulizer that increases the water resistance of the binders in the coating.

Relative to the typical properties listed for the finished paper, it is understood by those skilled in the art that 45 gloss means 75° TAPPI gloss of 45, 87 brightness means TPPI brightness and is a measure of the reflectance of light of a specific wavelength from paper, and 91.5 opacity (70#) is a TAPPI opacity which is a measurement of the amount of light transmitted through a sheet of paper having a basis weight of 70 lbs./ream. It also is understood that 2.1–2.3 Parker Print Smoothness is a TAPPI measurement of the smoothness of a sheet of paper and refers to the average depth of valleys in the paper surface, so the lower the number, the smoother the paper. A Parker Print Smoothness reading of 2.1–2.3 for the paper of the invention indicates that the paper is not particularly smooth compared to conventional coated gloss paper. A lack of extreme smoothness provides the paper with increased surface friction and improved runnability through a copier.

Another coating formulation for the paper of the invention is:

70 Hi-bright #1
22 fine carbonate
4 coarse carbonate
4 plastic pigment
3 starch
8.5 latex with minor ingredients comprising:

0.8 lubricant
0.2 insolubulizer
0.3 sodium alginate (viscosity modifier)
1.7 fwa (fluorescent whitener)
0.5 polyvinyl alcohol (binder)

Paper embodying the teachings of the invention has been made in various basis weights, where basis weight refers to the final weight of the paper and includes both coat weight and base sheet weight. It is contemplated that paper embodying the invention can be made at various basis weights ranging from 50–110 lbs/ream and, indeed, such paper has been made at basis weights of 60, 70, 80 and 110 lbs/ream.

Papers embodying the invention have been made and found to compare with conventional coated gloss paper as follows:

TABLE 1

Examples of Paper of Invention vs. Conventional Coated Gloss Paper (80# basis weight)

| | Invention Paper | Conventional Paper 1 | Conventional Paper 2 | Conventional Paper 3 |
|---|---|---|---|---|
| Gloss 75° | 48 | 74 | 75 | 72 |
| Opacity | 93.3 | 95.1 | 95.6 | 94.3 |
| Parker Print Surf Smoothness | 2.30 | 1.42 | 1.60 | 1.38 |
| Fiber Orientation* | 1.10 | 1.39 | 1.35 | 1.28 |
| Non-Fused Toner** | none | slight | much | much |

*ratio of machine direction/cross direction fiber orientation using laser measurement.
**subjective visual judgment of amount of unfused toner area using a 4-color Cannon 800 electrophotographic printer.

TABLE 2

Examples of Effect of Coating/Fiber Ratio on Fusion of Toner on Coated Gloss Paper

| | Invention Paper 1 | Invention Paper 2 | Conventional Paper |
|---|---|---|---|
| Coat Weight | 7 | 7 | 16 |
| Base Sheet Weight | 75 | 68 | 63 |
| Final Basis Weight | 82 | 75 | 80 |
| Non-Fused Toner** | none | none | some |

**See above.

TABLE 3

Relative Weights of Paper of Invention vs. Conventional Paper

| | Invention Paper | | | Conventional Paper | | |
|---|---|---|---|---|---|---|
| Final Basis Wt. | Coat Wt. | Base Sheet Wt. | Approx. Fiber Wt. | Coat Wt. | Base Sheet Wt. | Approx. Fiber Wt. |
| 60# | 7 | 51 | 40 | 17 | 41 | 33 |
| 70# | 7 | 59.5 | 47.5 | 17 | 49.5 | 38.5 |
| 80# | 7 | 60 | 57 | 17 | 60 | 47 |
| 110# | 7 | 88.5 | 82 | 17 | 88.5 | 72 |

In the immediately above table, final basis weight includes the weight of moisture, where moisture is on the order of 4–5%. Coat weight is the total bone dry coat weight, and the base sheet weight is the dry weight with 0% moisture. The base sheet weight includes "filler" pigment, which typically comprises 12–16% of conventional base sheet weight and 8–10% of the base sheet weight of the paper of the invention. The base sheet weight as shown above also includes a precoat size press coating weight, which precoat is typically 50–70% starch. All of the above weights are in terms of a 3300 square foot ream of paper.

As mentioned, the coating/fiber ratio of paper made according to the invention is relatively low compared to the same ratio for conventional coated gloss paper at a given basis weight, as shown by the following table:

TABLE 4

Coating/Fiber Ratios

| Basis Weight | Paper of Invention | Conventional Paper |
|---|---|---|
| 60# | 12%–31% | 43%–61% |
| 70# | 10%–25% | 37%–52% |

TABLE 4-continued

| Coating/Fiber Ratios | | |
|---|---|---|
| Basis Weight | Paper of Invention | Conventional Paper |
| 80# | 8%–21% | 30%–42% |
| 110# | 6%–14% | 20%–27% |

The ratios are calculated for the various basis weights using the fiber weights listed in the table next above. For the basis weight range 60–110 lbs., it is seen that the coating/fiber ratio of the paper of the invention is on the order of 27%–52% of the coating/fiber ratio of conventional coated gloss paper, for the typical coat weight range of each.

The lower coating/fiber ratio of paper made according to the invention also results in a lower coating/basis weight ratio of the paper as compared to conventional coated gloss paper of the same basic weight, as shown by the following table:

TABLE 5

| Coating/Basis Weight Ratios | | |
|---|---|---|
| Basis Weight | Paper of Invention | Conventional Paper |
| 60# | 8%–18% | 25%–31% |
| 70# | 7%–16% | 21%–27% |
| 80# | 6%–14% | 18%–24% |
| 110# | 4%–10% | 13%–17% |

For the basis weight range 60–110 lbs., it is seen that the coating/basis weight ratio of the paper of the invention is on the order of 33%–59% of the coating/basis weight ratio of conventional coated gloss paper, for the typical coat weight range of each.

While embodiments of the invention have been described in detail, various modifications and other embodiments thereof may be devised by one skilled in the art without departing from the spirit and scope of the invention, as defined in the appended claims.

What is claimed is:

1. A process for making a coated paper adapted to provide improved fusion of toner on a surface thereof at marginal fusion temperatures in an electrophotographic process, comprising the steps of providing a waterborne furnish; extruding the furnish onto a wire of a paper machine to form a paper web; pressing excess water from the web; drying the web to a moisture content less than 10%; coating each side of the paper web with a coat weight that is on the order of 2.5–5.5 pounds per side per ream; and calendering the coated paper web, said extruding and coating steps being controlled so that the coated paper has a basis weight of at least 60 pounds per ream.

2. A process as in claim 1, wherein said coating step applies a coat weight on the order of 3.5–4.0 pounds per side per ream.

3. A process as in claim 1, wherein said calendering step calenders the coated paper to a 75° TAPPI gloss of 35–50.

4. A process as in claim 1, wherein said calendering step calenders the coated paper to a 75° TAPPI gloss of about 45.

5. A process as in claim 1, wherein said extruding and coating steps are controlled so that the coated paper has a basis weight in the range of about 60–110 pounds per ream.

6. A process as in claim 1, wherein said extruding and coating steps are controlled so that the coated paper has a basis weight of about 60 pounds per ream and a coating weight/basis weight ratio on the order of 8%–18%.

7. A process as in claim 1, wherein said extruding and coating steps are controlled so that the coated paper has a basis weight of about 70 pounds per ream and a coating weight/basis weight ratio on the order of 7%–16%.

8. A process as in claim 1, wherein said extruding and coating steps are controlled so that the coated paper has a basis weight of about 80 pounds per ream and a coating weight/basis weight ratio on the order of 6%–14%.

9. A process as in claim 1, wherein said extruding and coating steps are controlled so that the coated paper has a basis weight of about 110 pounds per ream and a coating weight/basis weight ratio on the order of 4%–10%.

10. A process as in claim 1, wherein said extruding and coating steps are controlled so that the coated paper has a coating weight/basis weight ratio of 33% –59% of the coating weight/basis weight ratio of conventional coated gloss paper for a given basis weight.

11. A process as in claim 1, wherein said providing step provides a waterborne furnish containing fiber and said extruding and coating steps are controlled so that the coated paper has a basis weight of about 60 pounds per ream and a coating weight/fiber weight ratio on the order of 12%–31%.

12. A process as in claim 1, wherein said providing step provides a waterborne furnish containing fiber and said extruding and coating steps are controlled so that the coated paper has a basis weight of about 70 pounds per ream and a coating weight/fiber weight ratio on the order of 10%–25%.

13. A process as in claim 1, wherein said providing step provides a waterborne furnish containing fiber and said extruding and coating steps are controlled so that the coated paper has a basis weight of about 80 pounds per ream and a coating weight/fiber weight ratio on the order of 8%–21%.

14. A process as in claim 1, wherein said providing step provides a waterborne furnish containing fiber and said extruding and coating steps are controlled so that the coated paper has a basis weight of about 110 pounds per ream and a coating weight/fiber weight ratio on the order of 6%–14%.

15. A process as in claim 1, wherein said providing step provides a waterborne furnish containing fiber and said extruding and coating steps are controlled so that the coated paper has a coating weight/fiber weight ratio that is on the order of 27%–52% of the coating weight/fiber weight ratio of conventional coated gloss paper for a given basis weight.

16. A process as in claim 1, wherein said providing step provides furnish that forms a paper web having on the order of 7%–15% filler.

17. A process as in claim 1, wherein said providing step provides furnish that forms a paper web having on the order of 40%–50% less filler than is contained in a conventional paper web.

18. A process as in claim 1, including the step, prior to said coating step, of applying a precoat of lightly pigmented coating on each side of the paper web at a weight on the order of 1–2.5 pounds per side per ream.

19. A process as in claim 1, wherein said providing step provides furnish that is substantially groundwood free.

20. A process as in claim 1, wherein said providing step provides a furnish containing groundwood free high brightness bleached pulp.

21. A process for adhering toner to a coated paper, comprising the steps of providing a coated paper having a paper base and a coating on each side of the base, the coating being of a weight on the order of 2.5–5.5 pounds per side per ream and the coated paper having a basis weight of at least 60 pounds per ream; attracting toner to a surface of the coated paper; and, while the toner is attracted to the surface of the coated paper, subjecting the coated paper and toner to heat sufficient to melt and fuse the toner to the surface of the coated paper.

22. A process as in claim 21, wherein said providing step provides a coated paper that is calendered to a 75° TAPPI gloss of 35–50.

23. A process for making a coated paper adapted to provide improved fusion of toner on a surface thereof at marginal fusion temperatures in an electrophotographic process, comprising the steps of providing a waterborne furnish; extruding the furnish onto a wire of a paper machine to form a paper web; pressing excess water from the web; drying the web to a moisture content less than 10%; coating each side of the paper web with a coat weight that is on the order of 2.5–5.5 pounds per side per ream; said extruding and coating steps being controlled so that the coated paper has a basis weight of at least 80 pounds per ream.

24. A process as in claim 23, wherein said extruding and coating steps are controlled so that the coated paper has a basis weight of at least 110 pounds per ream.

25. A process as in claim 23, including the step of calendering the coated paper to a 75° TAPPI gloss on the order of 35–50.

26. A process at in claim 23, wherein said extruding and coating steps are controlled so that the coated paper has a coating weight/basis weight ratio on the order of 3%–10%.

27. A process as in claim 23, wherein said providing step provides a waterborne furnish containing fiber and said extruding and coating steps are controlled so that the coated paper has a coating weight/fiber weight ratio on the order of 5%–31%.

28. A process as in claim 23, wherein said providing step provides furnish that forms a paper web having on the order of 7%–15% filler.

29. A process as in claim 23, including the step, prior to said coating step, of applying a precoat of lightly pigmented coating on each side of the paper web at a weight on the order of 1–2.5 pounds per side per ream.

30. A process as in claim 23, wherein said providing step provides furnish that is substantially groundwood free.

31. A process as in claim 23, wherein said providing step provides a furnish containing groundwood free high brightness bleached pulp.

32. A process for making a coated paper adapted to provide improved fusion of toner on a surface thereof at marginal fusion temperatures in an electrophotographic process, comprising the steps of providing a waterborne furnish; extruding the furnish onto a wire of a paper machine to form a paper web; pressing excess water from the web; drying the web to a moisture content less than 10%; coating each side of the paper web with a coat weight that is at least 5 pounds per side per ream; said extruding and coating steps being controlled so that the coated paper has a basis weight of at least 80 pounds per ream.

33. A process as in claim 32, wherein said extruding and coating steps are controlled so that the coated paper has a basis weight of at least 110 pounds per ream.

34. A process as in claim 32, including the step of calendering the coated paper to a 75° TAPPI gloss on the order of 35–50.

35. A process at in claim 32, wherein said extruding and coating steps are controlled so that the coated paper has a coating weight/basis weight ratio on the order of 6%–10%.

36. A process as in claim 32, wherein said providing step provides a waterborne furnish containing fiber and said extruding and coating steps are controlled so that the coated paper has a coating weight/fiber weight ratio on the order of 5% –31%.

37. A process as in claim 32, wherein said providing step provides furnish that forms a paper web having on the order of 7%–15% filler.

38. A process as in claim 32, including the step, prior to said coating step, of applying a precoat of lightly pigmented coating on each side of the paper web at a weight on the order of 1–2.5 pounds per side per ream.

39. A process as in claim 32, wherein said providing step provides furnish that is substantially groundwood free.

40. A process as in claim 32, wherein said providing step provides a furnish containing groundwood free high brightness bleached pulp.

41. A process as in claim 21, wherein the coated paper has a basis weight to at least 110 pounds per ream.

* * * * *